(12) United States Patent
Pyo

(10) Patent No.: US 6,318,795 B1
(45) Date of Patent: Nov. 20, 2001

(54) VIBRATION PREVENTING STRUCTURE OF TAILGATE IN AUTOMOBILE

(75) Inventor: Ha-Geun Pyo, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/717,428

(22) Filed: Nov. 20, 2000

(30) Foreign Application Priority Data

Dec. 29, 1999 (KR) .................................................. 99-64670

(51) Int. Cl.$^7$ ....................................................... B60J 7/00
(52) U.S. Cl. ...................... 296/207; 296/146.8; 296/106; 296/76; 16/82; 16/86 R; 16/86 B
(58) Field of Search ................... 296/207, 146.8, 296/106, 76; 16/82, 86 R, 86 A, 86 B

(56) References Cited

U.S. PATENT DOCUMENTS

| | | | |
|---|---|---|---|
| 4,799,730 | * | 1/1989 | Harasaki ................................ 296/76 |
| 5,549,351 | * | 8/1996 | Park ..................................... 296/207 |
| 5,802,671 | * | 9/1998 | Ikuma ..................................... 16/82 |
| 6,106,047 | * | 8/2000 | Nagahashi et al. ..................... 296/93 |
| 6,164,715 | * | 12/2000 | Mosaner ........................... 296/146.1 |
| 6,174,016 | * | 1/2001 | Ponziani ........................... 296/146.8 |
| 6,203,094 | * | 3/2001 | Lee ..................................... 296/106 |
| 6,234,564 | * | 5/2001 | Kim ................................. 296/146.8 |

FOREIGN PATENT DOCUMENTS

0604215 * 12/1992 (EP) .
2675107 * 4/1991 (FR) .

* cited by examiner

Primary Examiner—Joseph D. Pape
Assistant Examiner—Kiran B. Patel
(74) Attorney, Agent, or Firm—Christie, Parker & Hale, LLP

(57) ABSTRACT

A vibration preventing structure of tailgate in an automobile wherein a plurality of hitching jaws formed at a first guide bumper are restricted by a rotary member of a second bumper guide at an automobile body when the tailgate is closed, while the jaws are detached when the tailgate is opened, thereby reducing the noise generated by vibration of the tailgate when the automobile is running, the structure comprising a first guide bumper protrusively coupled at a longitudinal end of the tailgate and sequentially formed with a plurality of hitching jaws; height adjustment device for adjusting a protruded height of the first guide bumper; a second guide bumper mounted at a body in order to allow the first guide bumper to be adhered when the tailgate is closed; a rotary member rotably mounted at the second guide bumper via a rotary axle and formed with a hook to be hitched by the hitching jaw of the first guide bumper; and operating device mounted at the second guide bumper for allowing the hook to be hitched by the hitching jaw by operating the rotary member when the first and second guide bumpers are adhered and for allowing the hook to be separated when the first and second guide bumpers are detached.

3 Claims, 4 Drawing Sheets

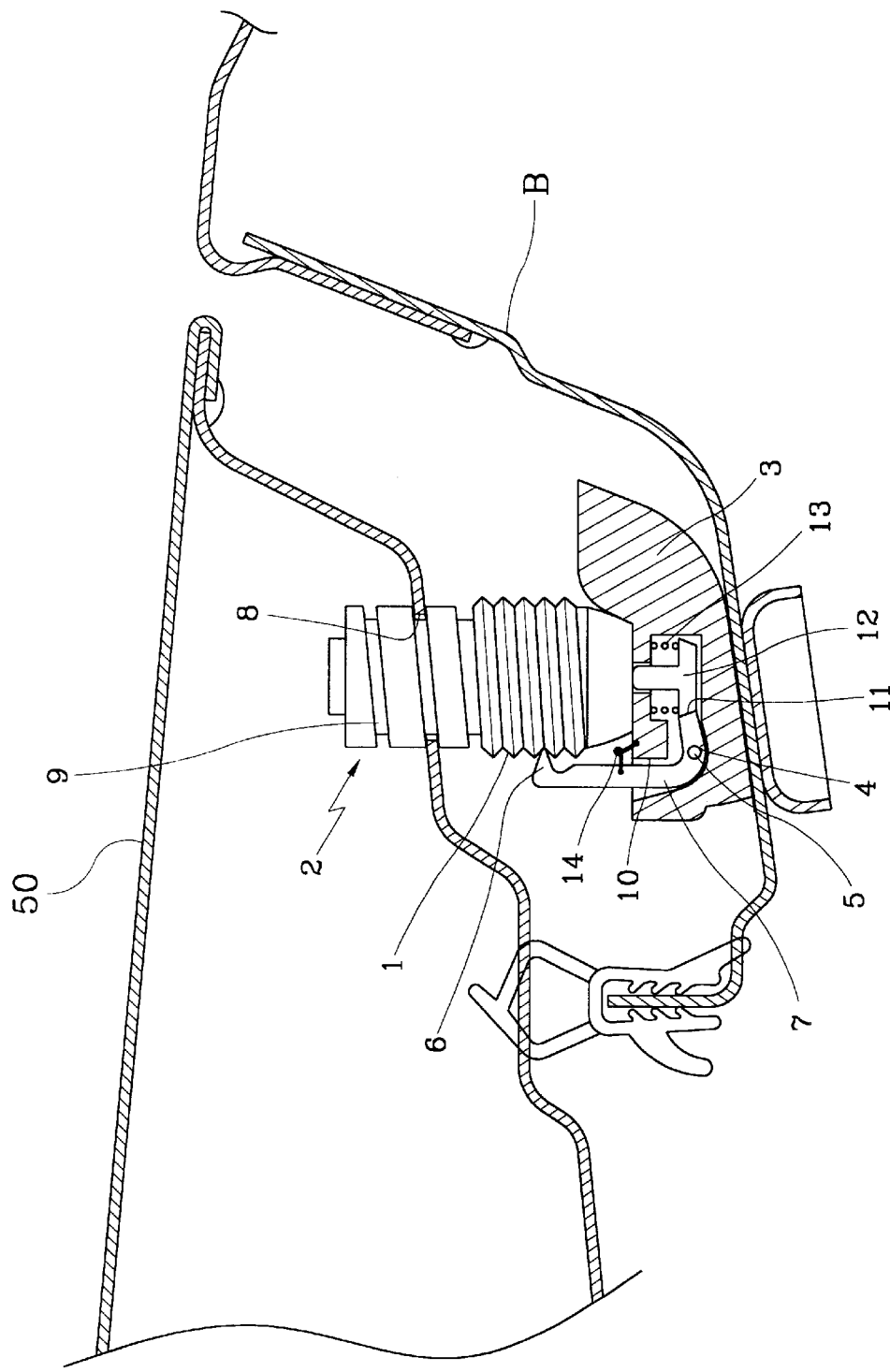

VIBRATION PREVENTING STRUCTURE OF TAILGATE IN AUTOMOBILE

BACKGROUND OF THE INVENTION

1. Field of the Invention

The present invention relates to a vibration preventing structure of tailgate in automobile, and more particularly to a vibration preventing structure of tailgate in automobile adapted to prevent a tailgate from vibrating in the opening and closing directions according to automobile vibration, thereby reducing noise generated from the tailgate.

2. Description of the Prior Art

Generally, an automobile is equipped with a plurality of doors for loading and unloading passengers and merchandises and one box cars such as jeep, van and the like are provided with a tailgate for loading and unloading merchandises in the rear compartment thereof.

The tailgate 50 thus described is rotably hinged to an upper end of roof panel (R) which is a rear surface of automobile body (B) by way of hinges 51 as illustrated in FIG. 2, and merchandises are accommodated through the tailgate 50.

Between the tailgate 50 and the automobile body (B), a weatherstrip is arranged to guarantee a watertightness and a guide bumper is also mounted to prevent swaying and trembling.

As illustrated in FIG. 3, the guide bumper is mounted with a first guide bumper 53 secured to a longitudinal end of the tailgate 50 by way of a bolt 52 and a second guide bumper 56 mounted at the body (B) for restricting H and L directions by being contacted by the first guide bumper 53 and first and second contact surfaces 54 and 55 when the tailgate 50 is closed.

In other words, when the tailgate 50 is closed the first and second guide bumpers 53 and 56 are closely contacted to prevent the tailgate 50 from vibrating in the H and L directions.

There is a problem in the conventional tailgate thus described in that, when the vibration of the tailgate is restricted by the mutually-adhered first and second guide bumpers, restriction cannot be made to the direction where the tailgate is opened, leaving the tailgate to vibrate while the automobile is running result in generation of noise.

SUMMARY OF THE INVENTION

The present invention is disclosed to solve the aforementioned problem and it is an object of the present invention to provide a vibration preventing structure of tailgate in an automobile adapted to reduce noise generated by vibration in the opening direction of the tailgate.

In accordance with the object of the present, there is provided a vibration preventing structure of tailgate in an automobile, the structure comprising:

a first guide bumper protrusively coupled at a longitudinal end of the tailgate and sequentially formed with a plurality of hitching jaws;

height adjustment means for adjusting a protruded height of the first guide bumper;

a second guide bumper mounted at a body in order to allow the first guide bumper to be adhered when the tailgate is closed;

a rotary member rotably mounted at the second guide bumper via a rotary axle and formed with a hook to be hitched by the hitching jaw of the first guide bumper; and operating means mounted at the second guide bumper for allowing the hook to be hitched by the hitching jaw by operating the rotary member when the first and second guide bumpers are adhered and for allowing the hook to be separated when the first and second guide bumpers are detached.

BRIEF DESCRIPTION OF THE DRAWINGS

For fuller understanding of the nature and objects of the invention, reference should be made to the following detailed description taken in conjunction with the accompanying drawings in which:

FIG. 1a is a sectional view for illustrating a tailgate vibration preventing structure for automobile according to the present invention;

FIG. 1b is a sectional view for illustrating an open state of the tailgate in FIG. 1a;

DETAILED DESCRIPTION OF THE INVENTION

Preferred embodiment of the present invention will now be described in detail with reference to the accompanying drawings.

Figure 1B:
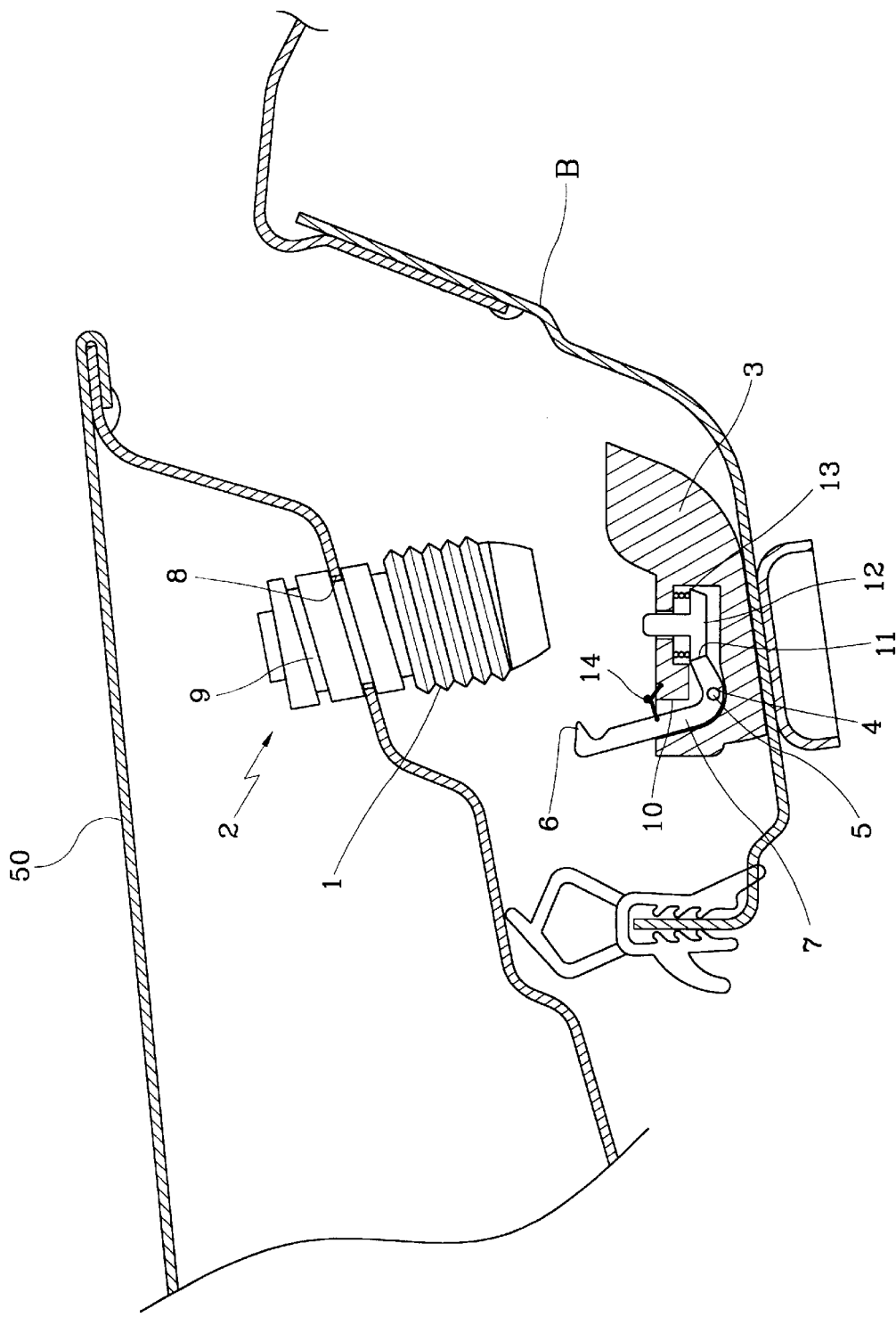
Figure 2:
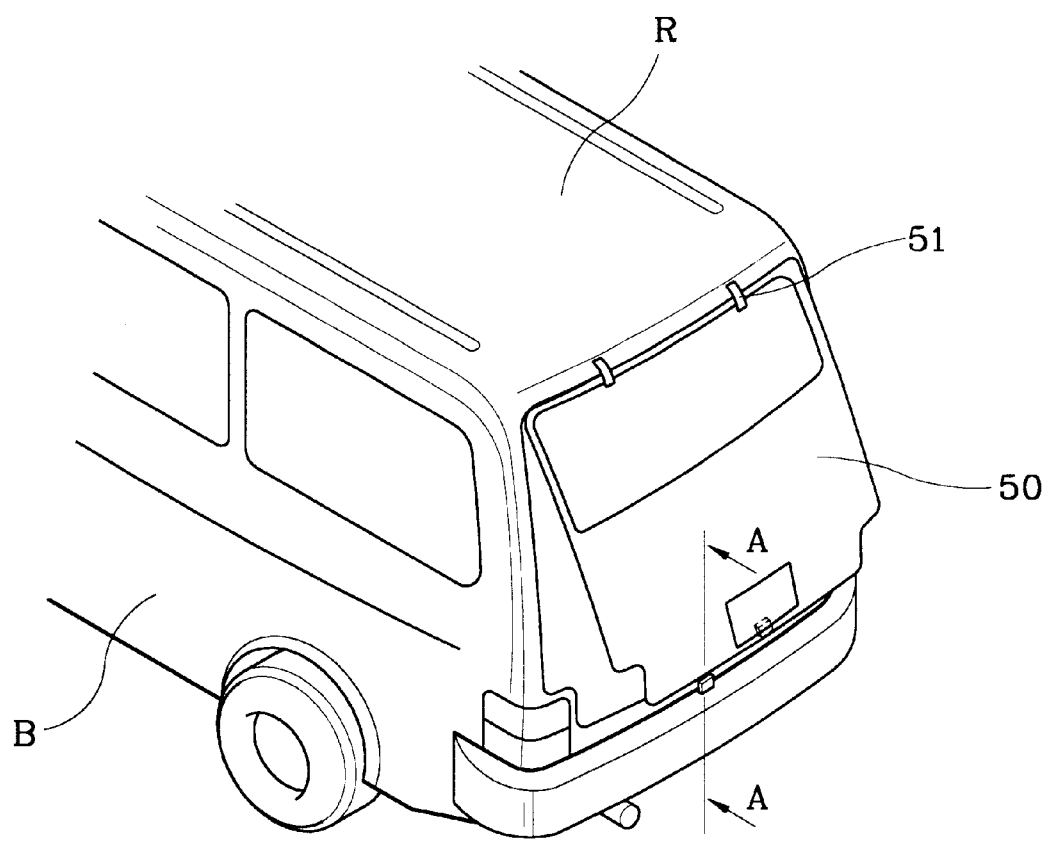
FIG. 2 is schematic perspective view for illustrating an automobile mounted with a tailgate according to the prior art.
Figure 3:
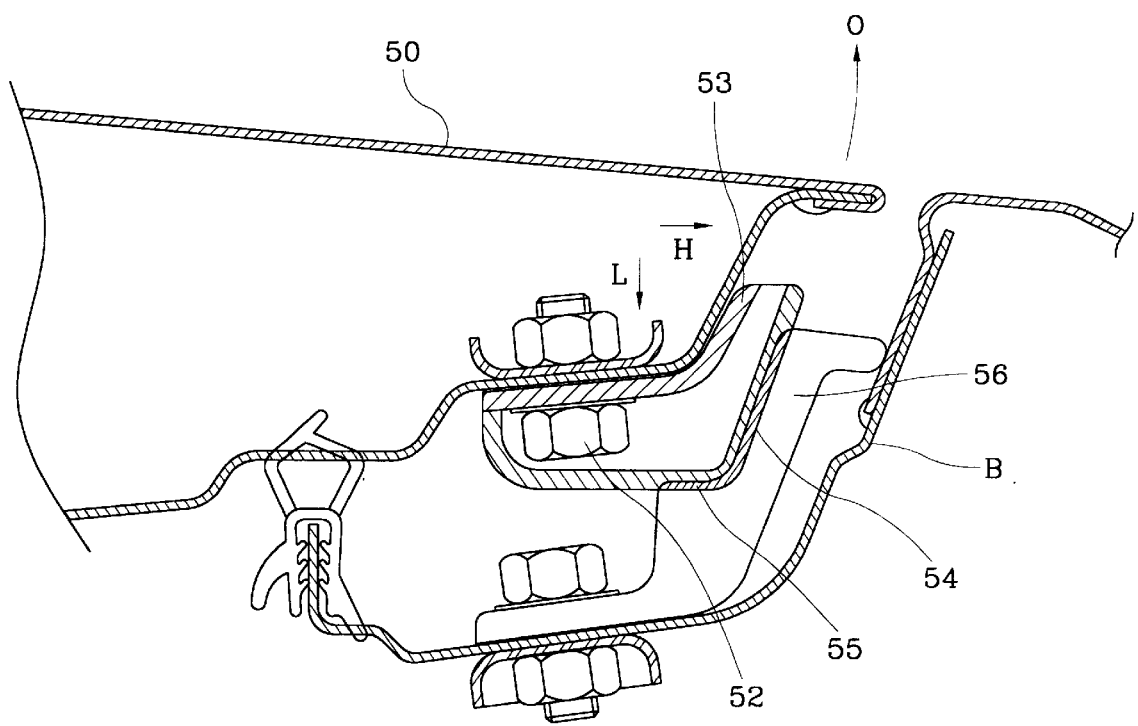
FIG. 3 is a sectional view taken along line A—A of FIG. 2 for illustrating a closed state of the tailgate.

FIGS. 1a and 1b are sectional views for illustrating a tailgate vibration preventing structure for automobile according to the present invention, where the structure comprises a first guide bumper 2 protrusively coupled at a longitudinal end of the tailgate 50 and sequentially formed with a plurality of hitching jaws 1, height adjustment means for adjusting a protruded height of the first guide bumper, a second guide bumper 3 formed at an automobile body (B) in order to allow the first guide bumper 2 to be adhered when the tailgate 50 is closed, a rotary member 7 rotably mounted at a hole 4 of the second guide bumper 3 via a rotary axle 5 and formed with a hook 6 to be hitched by the hitching jaw 1 of the first guide bumper, and operating means mounted at the second guide bumper 3 for allowing the hook 6 to be hitched by the hitching jaw 1 by operating the rotary member 7 when the first and second guide bumpers 2 and 3 are adhered and for allowing the hook 6 to be separated when the first and second guide bumpers 2 and 3 are detached.

The height adjustment means, comprised of a coupling hole 8 formed at the tailgate 50 and a screw hole 9 formed at the first guide bumper 2 for screw coupling with the coupling hole 8, servers to rotate the first guide bumper 2 to enable to adjust the height.

The operating means includes a through hole 10 formed to pierce an accommodation hole 4 at the second guide bumper 3, an operating member 12 formed with a flange 11 for being slidably inserted into the through hole 10 and for contacting an opposite end of the hook 6 at the rotary member 7, a first spring 13 for applying resilience to lift the operating member 12 and a second spring 14 for applying resilience to rotate the rotary member 7 counterclockwise.

In other words, when the first and second guide bumpers 2 and 3 and contacted, the tailgate 50 becomes closed, where the flange 11 of the operating member 12 rotates the rotary member 7 to allow the hook 6 and the hitching jaw 1 to get meshed, and when the tailgate 50 is opened, the hook 6 is detached from the hitching jaw 1 to open the tailgate 50.

Now, operating effect of the present invention thus constructed will be described.

In a state where the tailgate 50 is opened, the operating member 12 is lifted by resilience of the first spring 13 to be protrusively placed on the second guide bumper 3, and the rotary member 7 is in a rotated state by the resilience of the second spring 14 as illustrated in FIG. 1b.

When a user closes the tailgate 50 under this state, the first and second guide bumpers 2 and 3 are contacted and concomitantly the first guide bumper 2 presses the operating member 12 to let it go down.

When the operating member 12 is lowered, the flange 11 of the operating member 12 is contacted by a tip end opposite to the rotary member 7, where, when the operating member 12 keeps going down, the operating member 12 keeps pushing the rotary member 7 to rotate the rotary member 7 clockwise.

When the rotary member 7 is rotated clockwise, the hook 6 at the longitudinal end of the rotary member 7 is hitched by the hitching jaw 1 of the first guide bumper 2. When the hook 6 of the rotary member 7 is hooked, the tailgate 50 is restricted in its opening direction movement to thereby prevent the tailgate 50 from vibrating in the opening and closing directions when the automobile is running.

When the tailgate 50 is limited in its opening and closing direction vibrations, noise generated therefrom is avoided to thereby reduce the noise when the automobile equipped with the tailgate 50 is running.

When the user opens the tailgate 50 under this state, the tailgate 50 is opened upto a predetermined distance by pop-up force of a latch assembly (not shown) to slightly lift the operating member 12 according to the opened tailgate 50 and to rotate the rotary member 7 counterclockwise, such that the first guide bumper 2 is detached.

When the hook 6 of the rotarymember 7 is detached from the hitching jaw 1 of the first guide bumper 2, the first guide bumper 2 becomes free to allow the rotary member 7 to be prevented from being intervened.

As apparent from the foregoing, there is an advantage in the vibration preventing structure of tailgate in an automobile thus described according to the present invention in that the plurality of hitching jaws formed at the first guide bumper are restricted by the rotary member of the second bumper guide at the body when the tailgate is closed, while the jaws are detached when the tailgate is opened, thereby reducing the noise generated by vibration of the tailgate when the automobile is running.

What is claimed is:

1. A vibration preventing structure of tailgate in an automobile, the structure comprising:

a first guide bumper protrusively coupled at a longitudinal end of the tailgate and sequentially formed with a plurality of hitching jaws;

height adjustment means for adjusting a protruded height of the first guide bumper;

a second guide bumper mounted at a body in order to allow the first guide bumper to be adhered when the tailgate is closed;

a rotary member rotably mounted at the second guide bumper via a rotary axle and formed with a hook to be hitched by the hitching jaw of the first guide bumper; and operating means mounted at the second guide bumper for allowing the hook to be hitched by the hitching jaw by operating the rotary member when the first and second guide bumpers are adhered and for allowing the hook to be separated when the first and second guide bumpers are detached.

2. The structure as defined in claim 1, wherein the height adjustment means comprises:

a coupling hole formed at the tailgate; and a screw hole formed at the first guide bumper for screw coupling with the coupling hole.

3. The structure as defined in claim 1 or 2, wherein the operating means comprises:

a through hole formed to pierce an accommodation hole at the second guide bumper;

an operating member formed with a flange for being slidably inserted into the through hole and for contacting an opposite end of the hook at the rotary member;

a first spring for applying resilience to lift the operating member; and a second spring for applying resilience to rotate the rotary member counterclockwise.

\* \* \* \* \*